(12) United States Patent
Takahashi et al.

(10) Patent No.: US 10,560,165 B2
(45) Date of Patent: Feb. 11, 2020

(54) COMMUNICATION SYSTEM, METHOD OF CONTROLLING COMMUNICATION SYSTEM, BASE STATION APPARATUS, AND WIRELESS TERMINAL APPARATUS

(71) Applicant: Panasonic Intellectual Property Corporation of America, Torrance, CA (US)

(72) Inventors: Hiroshi Takahashi, Kanagawa (JP); Naganori Shirakata, Kanagawa (JP); Masataka Irie, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/059,879

(22) Filed: Aug. 9, 2018

(65) Prior Publication Data

US 2018/0375558 A1   Dec. 27, 2018

Related U.S. Application Data

(63) Continuation of application No. PCT/JP2017/006697, filed on Feb. 23, 2017.

(30) Foreign Application Priority Data

Mar. 17, 2016   (JP) .................................. 2016-054214

(51) Int. Cl.
*H04B 7/06* (2006.01)
*H04W 24/10* (2009.01)
(Continued)

(52) U.S. Cl.
CPC ......... *H04B 7/0617* (2013.01); *H04B 7/0632* (2013.01); *H04L 1/1664* (2013.01); *H04L 5/0053* (2013.01); *H04W 24/10* (2013.01)

(58) Field of Classification Search
CPC .. H04B 7/0626; H04B 7/0695; H04B 7/0617; H04B 7/088; H04B 7/0417;
(Continued)

(56) References Cited

U.S. PATENT DOCUMENTS

2015/0249929 A1* 9/2015 Irie ..................... H04B 7/0695
370/329

FOREIGN PATENT DOCUMENTS

| JP | 2012-507946 A | 3/2012 |
| JP | 2015-164271 A | 9/2015 |
| WO | 2010/053738 A2 | 5/2010 |

OTHER PUBLICATIONS

International Search Report of PCT application No. PCT/JP2017/006697 dated May 9, 2017.
(Continued)

*Primary Examiner* — Leila Malek
(74) *Attorney, Agent, or Firm* — Seed IP Law Group LLP

(57) ABSTRACT

When an STA receives first to fifth SSW frames (first training frames) transmitted from an AP, the STA measures reception quality thereof, and transmits a reception quality measurement result to the AP by incorporating the reception quality measurement result in an SSW-ACK frame (first feedback frame). In response, the AP selects a beam pattern satisfying a specific selection criterion based on the reception quality measurement result and employs the selected beam pattern as the transmission beam pattern for use in transmission to the STA.

9 Claims, 14 Drawing Sheets

(51) Int. Cl.
*H04L 1/16* (2006.01)
*H04L 5/00* (2006.01)

(58) Field of Classification Search
CPC .. H04B 17/309; H04B 7/0632; H04B 7/0408; H04B 17/318; H04B 7/0619; H04B 17/24; H04B 7/043; H04L 5/0057; H04L 1/0026; H04W 24/10; H04W 72/046; H04W 16/28; H04W 72/085; H04W 40/12
USPC ..................................................... 375/267
See application file for complete search history.

(56) References Cited

OTHER PUBLICATIONS

IEEE 802.11ad (TM)—2012 IEEE Standard for Information Technology—Telecommunications and information exchange between systems Local and Metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.

* cited by examiner

FIG. 5

| BEAM PATTERN | AP (Initiator) | | STA (Responder) | |
|---|---|---|---|---|
| | TRANSMISSION BEAM ID | RECEPTION BEAM ID | TRANSMISSION BEAM ID | RECEPTION BEAM ID |
| #0 | #itx0 | #irx0 | #rtx0 | #rrx0 |
| #1 | #itx1 | #irx1 | #rtx1 | #rrx1 |
| #2 | #itx2 | #irx2 | #rtx2 | #rrx2 |
| #3 | #itx3 | #irx3 | #rtx3 | #rrx3 |
| #4 | #itx4 | #irx4 | #rtx4 | #rrx4 |
| #5 | #itx5 | #irx5 | #rtx5 | #rrx5 |
| — | #itx_select | #irx_select | #rtx_select | #rrx_select |

FIG. 9

| FRAME TYPE | WIRELESS COMMUNICATION APPARATUS THAT PERFORMS TRANSMISSION | AP (Initiator) | | STA1 (Responder) | |
|---|---|---|---|---|---|
| | | TRANSMISSION BEAM ID | RECEPTION BEAM ID | TRANSMISSION BEAM ID | RECEPTION BEAM ID |
| Grant (60) | Initiator | #itx0 | — | — | #rrx0 |
| FIRST SSW (61A) | Initiator | #itx1 | — | — | |
| SECOND SSW (61B) | Initiator | #itx2 | — | — | |
| THIRD SSW (61C) | Initiator | #itx3 | — | — | |
| FOURTH SSW (61D) | Initiator | #itx4 | — | — | |
| FIFTH SSW (61E) | Initiator | #itx5 | — | — | |
| SIXTH SSW (62A) | Responder | — | #irx0 | #rtx1 | — |
| SEVENTH SSW (62B) | Responder | — | | #rtx2 | — |
| EIGHTH SSW (62C) | Responder | — | | #rtx3 | — |
| NINTH SSW (62D) | Responder | — | | #rtx4 | — |
| TENTH SSW (62E) | Responder | — | | #rtx5 | — |
| SSW-Feedback (63) | Initiator | #itx0 | — | — | #rrx0 |
| SSW-ACK (64) | Responder | — | #irx0 | #rtx0 | — |

FIG. 10

| 611 | 612 | 613 | 614 |
|---|---|---|---|
| FRAME TYPE | TRANSMISSION SOURCE ADDRESS | DESTINATION ADDRESS | TRANSMISSION BEAM ID |

FIG. 11

| BEAM ID ACQUIRED FROM RECEIVED SSW FRAME | SNR |
|---|---|
| #itx1 | 80 |
| #itx2 | 90 |
| #itx4 | 100 |
| #itx5 | 70 |

FIG. 12

| BEAM ID ACQUIRED FROM RECEIVED SSW FRAME | SNR |
|---|---|
| #rtx1 | 30 |
| #rtx2 | 90 |
| #rtx3 | 80 |
| #rtx4 | 95 |
| #rtx5 | 60 |

COMMUNICATION SYSTEM, METHOD OF CONTROLLING COMMUNICATION SYSTEM, BASE STATION APPARATUS, AND WIRELESS TERMINAL APPARATUS

BACKGROUND

1. Technical Field

The present disclosure relates to a communication system that determines a beam pattern used in communication by performing beamforming training, a method of controlling a communication system, a base station apparatus, and a wireless terminal apparatus.

2. Description of the Related Art

Recently, millimeter wave communication using radio signals in a millimeter wave band (such as a 60 GHz band, or the like) has become popular because of its high transmission rate and no requirement for license. As for standards for wireless communication using a millimeter wave band, for example, the following are available: WiGig (Wireless Gigabit), Wireless HD (High Definition), ECMA-387, IEEE802.15.3c, and IEEE802.11ad.

Radio signals in a millimeter wave band have radio wave characteristics that radio waves propagate in a straightforward manner and a large space propagation loss occurs. In view of the above, in the millimeter wave communication, beamforming is performed to control the directivity of the radio signal using a plurality of antennas.

The beamforming is a technique of controlling a direction and a width of a beam in a directional communication area while following the location of a wireless communication apparatus with which communication is being performed. In the beamforming technique, in a case where a plurality of communication partners (wireless communication apparatuses) exist in a range within which a terminal forms a beam, connections with the plurality of wireless communication apparatuses are established by performing time-division switching of the beam direction.

As for a standard for millimeter wave band wireless communication including a beamforming technique, for example, IEEE802.11ad standard (IEEE 802.11ad-2012 IEEE Standard for Information Technology-Telecommunications and Information Exchange between systems-Local and Metropolitan networks-Specific requirement-Part 11: Wireless LAN Medium Access Control (MAC) and Physical Layer (PHY) Specifications Amendment Enhancements for Very High Throughput in the 60 GHz Band) is available. A technique (beamforming protocol) of selecting a beam pattern for use in communication from a plurality of beam patterns is described in (IEEE 802.11ad-2012 IEEE Standard for Information Technology-Telecommunications and Information Exchange between systems-Local and Metropolitan networks-Specific requirement-Part 11: Wireless LA N Medium Access Control (MAC) and Physical Layer (PHY) Specifications Amendment Enhancements for Very High Throughput in the 60 GHz Band). In this technique, wireless communication apparatuses communicating with each other change a beam pattern and transmit, using the changed beam pattern, a training frame including information for selecting an optimum beam pattern thereby selecting the beam pattern optimum for communication.

An example of an application of the beamforming technique is described, for example, in Japanese Unexamined Patent Application Publication (Translation of PCT Application) No. 2012-507946. In this example, in a case where a first wireless communication apparatus transmits a training frame to a second wireless communication apparatus with which communication is performed, part or all of reception results of training frames received before from the second wireless communication apparatus are transmitted thereby feeding back the reception results.

SUMMARY

In the beamforming protocol disclosed in IEEE 802.11ad-2012 IEEE Standard for Information Technology-Telecommunications and Information Exchange between systems-Local and Metropolitan networks-Specific requirement-Part 11: Wireless LAN Medium Access Control (MAC) and Physical Layer (PHY) Specifications Amendment 3: Enhancements for Very High Throughput in the 60 GHz Band, the beam selection is performed not by the first wireless communication apparatus but by the second wireless communication apparatus. The second wireless communication apparatus selects a beam pattern having highest reception quality from a plurality of received training frames, and notifies the first wireless communication apparatus of an ID of the selected beam pattern. For example, in a communication system in which a plurality of wireless communication apparatuses exist close to the first wireless communication apparatus and thus much interference is likely to occur, it is desirable that an optimum beam pattern is selected and determined by the first wireless communication apparatus taking into account influence of interference. However, there is no way of feeding back reception results, at the second wireless communication apparatus, of all training frames to the first wireless communication apparatus, it is difficult to make the selection and the decision by the first wireless communication apparatus.

In the method disclosed in Japanese Unexamined Patent Application Publication (Translation of PCT Application) No. 2012-507946, bi-directional sector sweep in both transmission and reception is performed. In this method, in response to a transmission sector sweep, data is transmitted as feedback information from a second wireless communication apparatus to a first wireless communication apparatus, wherein the feedback data includes identifiers of three best data units of data units received from the first wireless communication apparatus, and best and worst quality identifiers, or all identifiers and corresponding quality metrics. Although this method can solve the above-described item, a training frame includes information for feeding back a reception result, and thus an increase occurs in the total amount of data of a plurality of training frames, which results in a reduction in communication efficiency.

One non-limiting and exemplary embodiment provides a communication system, a method of controlling a communication system, a base station apparatus, and a wireless terminal apparatus, allowing it to maintain a communication efficiency without increasing the total amount of data of training frames even in an environment where a plurality of wireless communication networks exist close to each other.

In one general aspect, the techniques disclosed here feature a communication system including one or more wireless terminal apparatuses and a base station apparatus that performs a wireless communication with the one or more wireless terminal apparatuses, wherein in a transmission beamforming training interval in which beamforming training of a transmission beam is performed, the base station apparatus transmits to the wireless terminal apparatus a plurality of first training frames while sequentially switching a plurality of first transmission beam patterns; the one or more wireless terminal apparatuses perform an operation including receiving the plurality of first training frames using a particular beam pattern, measuring first reception quality of the received plurality of first training frames, and generating a second feedback frame including the measured first reception quality and transmitting the generated second feedback frame to the base station apparatus, the base station apparatus performs an operation including: receiving the second feedback frame, and selecting one beam pattern from the plurality of first transmission beam patterns based on the first reception quality included in the second feedback frame.

The disclosed embodiments make it possible to maintain a high communication efficiency without increasing the total amount of data of training frames even in an environment in which a plurality of wireless communication networks are located close to each other.

It should be noted that general or specific embodiments may be implemented by any selective combination of a system, an apparatus, and a method.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating an example of a correspondence between a beam pattern and a transmission beam ID and a reception beam ID in each of AP and STA;

FIG. 9 is a diagram illustrating an example of a beam pattern used by each of AP and STA in transmission and reception of first to tenth SSW frames;

FIG. 10 is a diagram illustrating an example of a frame format of an SSW frame which is a first training frame;

FIG. 11 is a diagram illustrating an example of a result of measurement of reception quality for first to fifth SSW frames received by STA;

FIG. 12 is a diagram illustrating an example of a result of measurement of reception quality for sixth to tenth SSW frames received by AP;

DETAILED DESCRIPTION

In an example of a wireless communication network, one base station (AP (Access Point)) manages wireless communication with a plurality of wireless terminal apparatuses (STA (Station)). In a case where there is no other wireless communication network close to the one wireless communication network, the AP in this one wireless communication network performs beamforming training individually for each STA to select an optimum beam pattern from a plurality of beam patterns.

As a result, it becomes possible for the AP to select a beam pattern that provides highest communication quality, and thus it is possible to achieve best communication quality (system throughput) in the wireless communication network. Note that in the present disclosure, the beam indicates a range (communication area) within which a radio signal can be transmitted and received.

However, in a case where there is another wireless communication network close to the one wireless communication network, if the AP in the one wireless communication network selects a beam pattern that provides highest reception quality, this can result in a situation in which communication areas established as a result of selecting the beam pattern have an overlap between different wireless communication networks.

Figure 1:
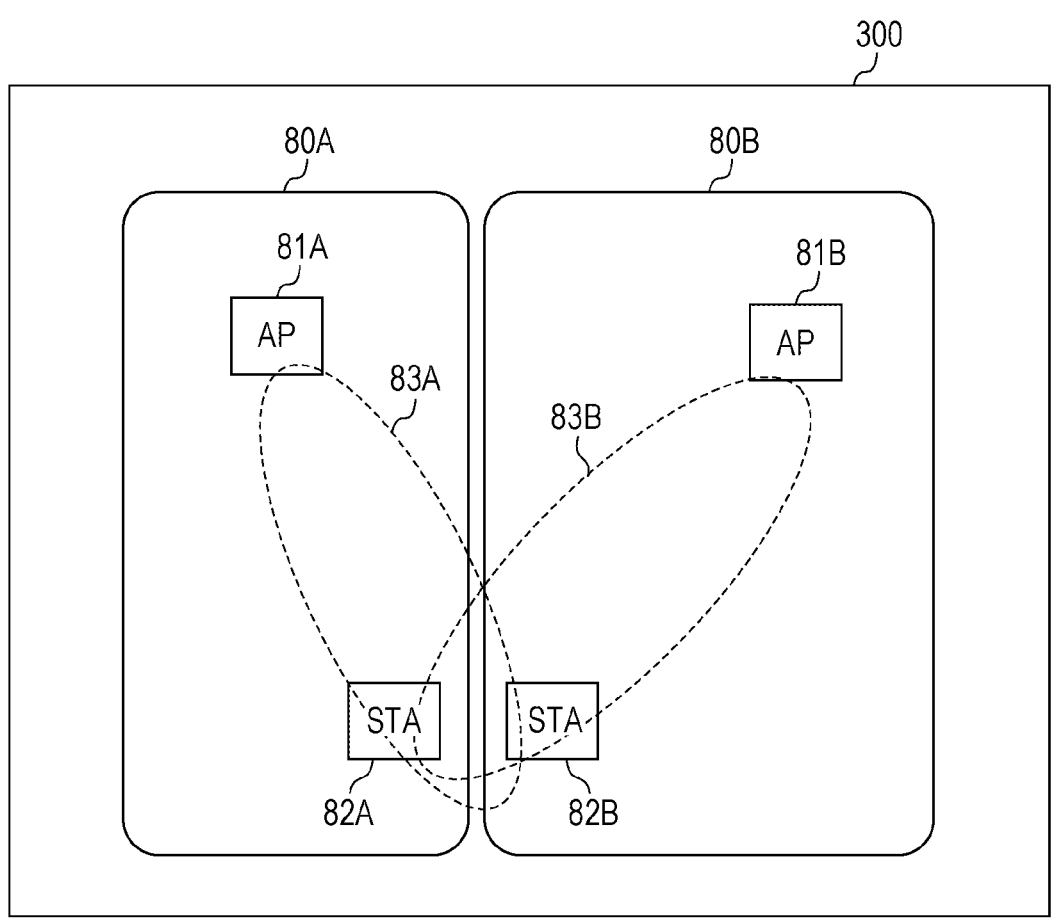
FIG. 1 is a diagram illustrating an example in which a plurality of wireless communication networks have an overlapping communication service area.

FIG. 1 is a diagram illustrating a specific example in which overlapping of communication service area occurs between a plurality of wireless communication networks. In a communication system 300 shown in FIG. 1, two wireless communication networks 80A and 80B are located close to each other. The communication system 300 is a communication system according to IEEE802.11ad which is a standard for millimeter wave communication. The two wireless communication networks 80A and 80B operate according to the same access control method (for example, CSMA/CA (Carrier Sense Multiple Access with Collision Avoidance) method).

The wireless communication network 80A shown in FIG. 1 is a network managed by the AP 81A, and the STA 82A is connected to the AP 81A. Similarly, the wireless communication network 80B is a network managed by the AP 81B, and the STA 82B is connected to the AP 81B. In the wireless communication network 80A, the AP 81A and the STA 82A perform beamforming training and select a beam pattern that provides highest communication quality. Similarly, in the wireless communication network 80B, the AP 81B and the STA 82B perform beamforming training and select a beam pattern that provides highest communication quality.

In the example shown in FIG. 1, a communication area 83A is an area in which communication is allowed using a beam pattern selected as a result of beamforming training performed between the AP 81A and the STA 82A. Similarly, in FIG. 1, a communication area 83B is an area in which communication is allowed using a beam pattern selected as a result of beamforming training performed between the AP 81B and the STA 82B.

In a case where the STAs 82A and 82B are located close to each other, the communication area 83A and the communication area 83B partially overlap each other as shown in FIG. 1. In this situation, if communication in the wireless communication network 80A and communication in the wireless communication network 80B occur at the same time, interference such as co-channel interference, adjacent channel interference, or the like can occur, which results in a reduction in communication quality (system throughput). Dynamic channel change (DFS (Dynamic Frequency Selection) is generally known as a technique to reduce co-channel interference or adjacent channel interference. However, in communication systems according to IEEE802.11ad, the number of available channels is not large, and thus it is difficult to reduce interference by using DFS.

Therefore, in an environment in which a large number of wireless communication networks exist close together, instead of simply selecting a beam pattern that provides highest communication quality in each wireless communication network, it is necessary to perform a beam pattern selection taking into account an influence (interference) from another wireless communication network.

However, in communication systems according to IEEE802.11ad, when beamforming training is performed, an STA notifies an AP of a beam pattern that provides highest communication quality among training frames received as training signals from the AP. Thus, although it is easy for the AP to get to know which one of a plurality of transmission beam patterns provides highest communication quality, it is difficult to get to know how good the transmission beam pattern is compared with other transmission beam patterns. No way is provided to feed back reception quality of all training frames evaluated by an STA to an AP, and thus it is difficult for the AP to select a beam pattern taking into account an influence (interference) from other wireless communication networks.

In the technique disclosed in Japanese Unexamined Patent Application Publication (Translation of PCT Application) No. 2012-507946, an STA feeds back information in response to transmission sector sweep performed by an AP, and thus the item in the situation described above can be solved. However, information for notifying of the reception quality is incorporated in each training frame transmitted from an STA to an AP, and thus this information causes an increase in the total amount of data associated with the training frame, which results in a reduction in communication efficiency.

One non-limiting embodiment of the present disclosure provides a communication system, a method of controlling a communication system, a base station apparatus, and a wireless terminal apparatus, that are capable of maintaining a high communication efficiency without increasing the total amount of data associated with the training frame even in an environment in which a plurality of wireless communication networks are located close to each other.

Embodiments

Example of Configuration of Communication System

Figure 2:
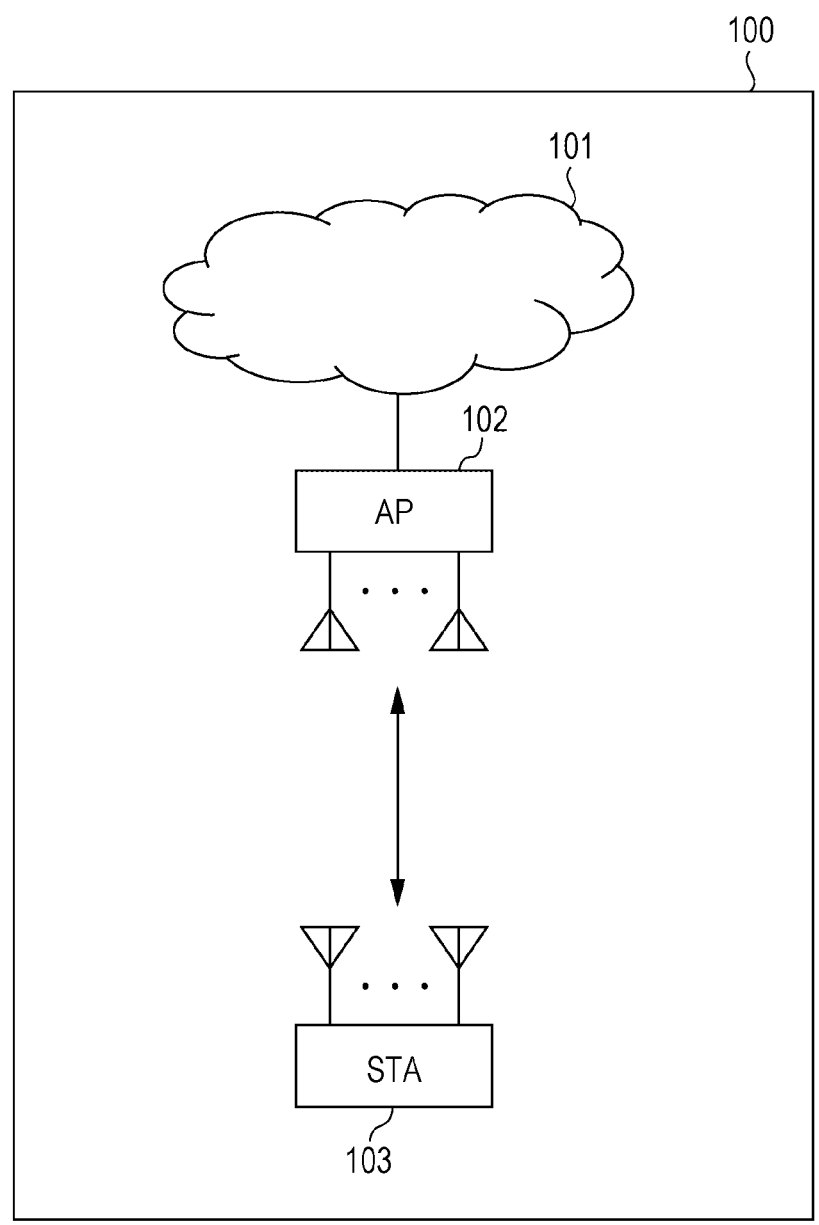
FIG. 2 is a diagram illustrating an example of a communication system according to an embodiment of the disclosure.

FIG. 2 is a diagram illustrating an example of a communication system according to an embodiment of the disclosure. The communication system 100 shown in FIG. 2 includes a communication network 101 such as the Internet, a wireless communication apparatus 102 connected to the communication network 101, and a wireless communication apparatus 103 connected to the communication network 101 via wireless communication performed with the wireless communication apparatus 102. The wireless communication apparatus 102 and the wireless communication apparatus 103 have a similar configuration, but they execute different processes depending on whether they operate as an AP (Access Point: base station apparatus) or an STA (Station: wireless terminal apparatus).

In the embodiment of the present disclosure described below, the wireless communication apparatus 102 operates as an access point for the wireless communication apparatus 103 and manages accessing of the wireless communication apparatus 103 to the communication network 101 by performing transferring of data between the wireless communication apparatus 103 and the communication network 101. Note that the wireless communication apparatus 102 and the wireless communication apparatus 103 each are a communication apparatus according to the millimeter wave communication standard of IEEE802.11ad.

Example of Configuration of Wireless Communication Apparatus

Figure 3:
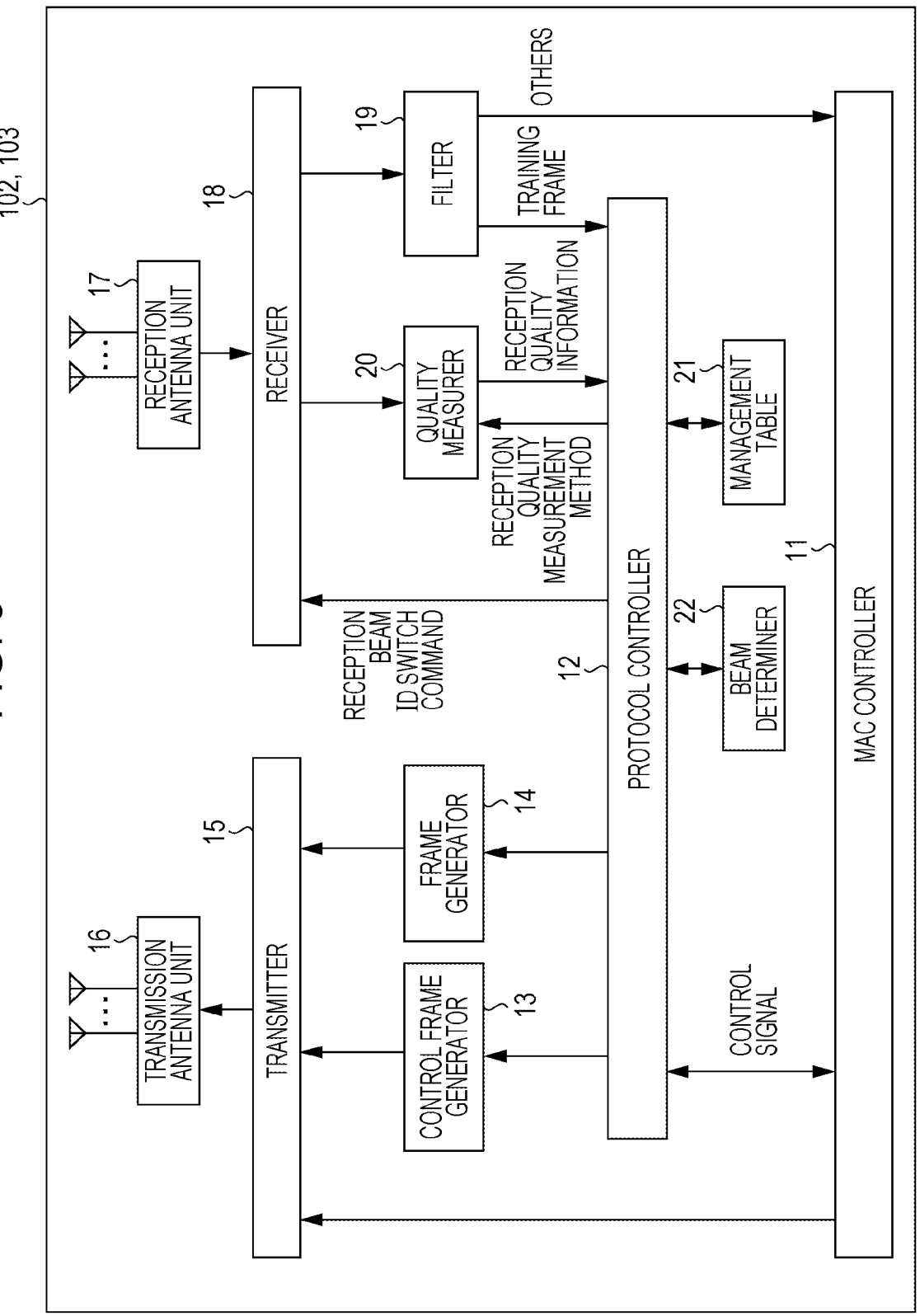
FIG. 3 is a diagram illustrating an example of a configuration of a wireless communication apparatus.

FIG. 3 is a diagram illustrating an example of a configuration of the wireless communication apparatus 102 (103). In FIG. 3, the wireless communication apparatus 102 (103) includes a MAC controller 11, a protocol controller 12, a control frame generator 13, a frame generator 14, a transmitter 15, a transmission antenna unit 16, a reception antenna unit 17, a receiver 18, a filter 19, a quality measurer 20, a management table 21, and a beam determiner 22.

Although not shown in the figure, the wireless communication apparatus 102 (103) includes, for example, a CPU (Central Processing Unit) a storage medium such as a ROM (Read Only Memory) or the like in which a control program is stored, and a work memory such as a RAM (Random Access Memory) or the like, and functions of the respective blocks shown in FIG. 3 are realized by the CPU by executing the control program.

The MAC controller 11 controls accessing when data is transmitted or received. More specifically, when a data frame to be transmitted occurs, the MAC controller 11 outputs, to the transmitter 15, a MAC frame including MCS and a beam ID which is index information of a beam pattern to be used in transmission. Note that MCS (Modulation and Coding Scheme) is index information indicating a combination of a modulation method, a code rate, and the like used in transmission. A MAC (Media Access Control) frame is a frame including information indicating a transmission destination address and the like.

When the MAC controller 11 receives a data frame or a training protocol control frame from the filter 19, in a case where the received data is a data frame, the MAC controller 11 outputs data to a higher-level application, but in a case where the received data is a training protocol control frame, the MAC controller 11 outputs a control signal to the protocol controller 12. In a case where the MAC controller 11 acquires a protocol control frame other than the training protocol control frame, the MAC controller 11 performs a protocol control (for example, a connection process, a bandwidth management process, or the like) depending on the acquired protocol control frame. Note that the training protocol control frame is a frame including information used in beamforming training described below.

The protocol controller 12 controls a process associated with the beamforming training. More specifically, based on a training protocol start request acquired from the MAC controller 11, the protocol controller 12 outputs a protocol control frame generation request to the control frame generator 13, and the protocol controller 12 outputs a training frame generation request to the frame generator 14.

Furthermore, the protocol controller 12 outputs a specification request specifying a reception quality measurement method to the quality measurer 20. The reception quality measurement method output here by the protocol controller 12 is specified in specification information included in a first protocol control frame acquired from the MAC controller 11. Details of the specification information will be described later. The protocol controller 12 then outputs, to the receiver 18, a reception beam ID for switching a reception beam pattern used in a reception process performed with a wireless communication apparatus with which communication is performed.

In a case where a training protocol control frame acquired from the wireless communication apparatus with which the communication is performed is received from the MAC controller 11, the protocol controller 12 outputs reception quality information acquired from the quality measurer 20 to the management table 21.

Based on the protocol control frame generation request acquired from the protocol controller 12, the control frame generator 13 generates a control frame for controlling the training protocol and outputs, to the transmitter 15, the training protocol control frame together with a beam ID specifying a beam pattern for transmitting the training protocol control frame.

The frame generator 14 generates the training frame based on the training frame generation request acquired from the protocol controller 12, and the frame generator 14 outputs, to the transmitter 15, the generated training frame together with the beam ID specifying the beam pattern for transmitting the training frame.

The transmitter 15 performs a modulation process, based on the MCS, on the MAC frame, the training protocol control frame, or the training frame respectively acquired from the MAC controller 11, the control frame generator 13, and the frame generator 14, and the transmitter 15 outputs the modulated transmission signal and the beam ID to the transmission antenna unit 16.

The transmission antenna unit 16 has an array antenna including a plurality of antenna elements and transmits the transmission signal input from the transmitter 15 into space. The transmission antenna unit 16 forms a plurality of beam patterns by controlling a phase and/or an amplitude of each array antenna element based on information including the beam ID and the line input from the transmitter 15, and the transmission antenna unit 16 transmits the transmission signal using the formed beam patterns.

The reception antenna unit 17 has an array antenna including a plurality of antenna elements and receives a transmission signal transmitted from another wireless communication apparatus and outputs the received transmission signal as a reception signal to the receiver 18. The reception antenna unit 17 forms a plurality of beam patterns by controlling a phase and/or an amplitude of each array antenna element and performs reception using the formed beam patterns.

The receiver 18 demodulates the reception signal acquired from the reception antenna unit 17 and outputs the demodulated data (a reception frame) to the filter 19. To perform the beamforming training, the receiver 18 controls the array antenna of the reception antenna unit 17 based on the reception beam ID acquired from the protocol controller 12 such that a beam pattern corresponding to the input reception beam ID is formed.

The filter 19 analyzes a header of the reception frame input from the receiver 18 thereby detecting a frame type of the reception frame. In a case where the filter 19 determines, from a result of the analysis, that the received frame is a training frame, the filter 19 outputs the received frame to the protocol controller 12. In a case where the received frame is a frame other than the training frame, the filter 19 outputs the received frame to the MAC controller 11.

The quality measurer 20 measures the reception quality of the reception signal based on the measurement method specification request acquired from the protocol controller 12 and the result of the demodulation performed by the receiver 18, and the quality measurer 20 generates reception quality information. The quality measurer 20 may employ, as the measurement method, for example, any one of or any combination of RSSI (Received Signal Strength Indicator), SNR (Signal to Noise ratio), SINR (Signal-to-Interference plus Noise power Ratio), an error rate (BER (bit error rate)), PER (packet error rate), FER (frame error rate), and the number of retransmissions. The quality measurer 20 outputs the measured reception quality information to the protocol controller 12.

The management table 21 manages a transmission beam ID corresponding to a beam pattern used in transmitting data to a wireless communication apparatus with which communication is performed and a reception beam ID corresponding to a beam pattern used in receiving data such that the transmission beam ID and the corresponding reception beam ID are associated. The management table 21 also manages the beam ID and the corresponding reception quality information received from the quality measurer 20 in an associated manner.

The beam determiner 22 acquires information regarding a training result from the protocol controller 12, selects a beam pattern to be used in transmission or reception, and notifies the protocol controller 12 of an ID corresponding to the selected beam pattern.

Explanation of Beam Pattern

Figure 4:
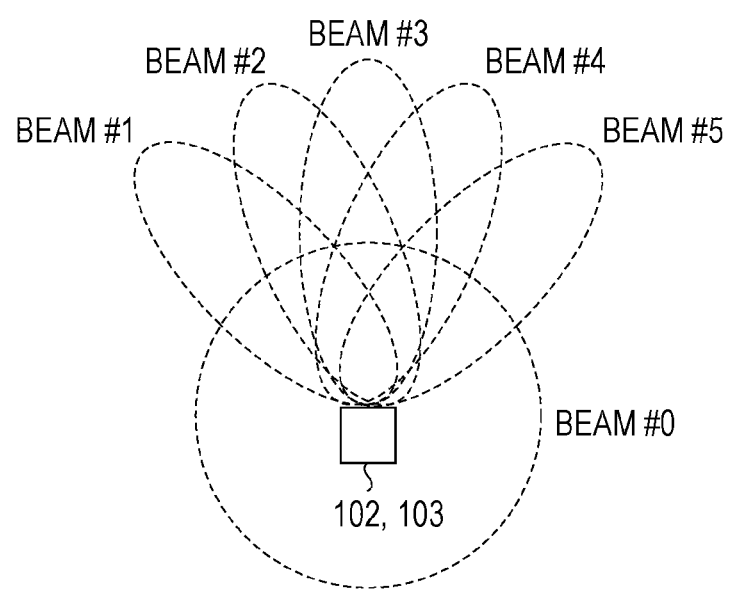
FIG. 4 is a diagram illustrating an example of a beam pattern formed by a wireless communication apparatus.

Next, beam patterns formed by the wireless communication apparatus 102 (103) are described below with reference to FIG. 4. FIG. 4 is a diagram illustrating an example of a set of beam patterns formed by the wireless communication apparatus 102 (103).

In the example shown in FIG. 4, six types of beam patterns are formed by the wireless communication apparatus 102 (103). The wireless communication apparatus 102 (103) forms one of the six types of beam patterns using the array antenna of the transmission antenna unit 16, and perform communication using the formed beam pattern. In FIG. 4, the six types of beam patterns available by the wireless communication apparatus 102 (103) are different in beam direction and include high directivity beam patterns and omnidirectional beam patterns. The protocol control is performed mainly using an omnidirectional beam pattern, and the data communication is performed mainly using a high directivity beam pattern. However, the protocol control may be performed using a high directivity beam pattern, and the data communication may be performed using an omnidirectional beam pattern. In FIG. 4, beams #1 to #5 are examples of high directivity beam patterns and beam #0 is an example of an omnidirectional beam pattern.

Although beam patterns formed by the transmission antenna unit 16 are described above, beam patterns are formed by the reception antenna unit 17 in a similar manner.

Next, beam IDs corresponding to the respective beam patterns are described below. FIG. 5 is a diagram illustrating a correspondence between a beam pattern and a transmission beam ID and a reception beam ID in each of AP and STA. In the following description, when the wireless communication apparatus 102 (103) operates as an AP, it is referred to simply as an AP, while when the wireless communication apparatus 102 (103) operates as an STA, it is referred to simply as an STA.

In FIG. 5, for a case in which the wireless communication apparatus 102 operates as an AP, a transmission beam ID corresponding to each beam pattern is described in a field of "transmission beam ID" of "AP (Initiator)". Each transmission beam ID is represented by #itxN (N is an integer corresponding to the number of beam patterns, and in FIG. 5, N is one of integers from 1 to 5). In a field of "reception beam ID" of "AP (Initiator)", a reception beam ID #irxN corresponding to each beam pattern is described.

In FIG. 5, for a case where the wireless communication apparatus 103 operates as an STA, a transmission beam ID #rtxN corresponding to each beam pattern is described in a field of "transmission beam ID" of "STA (Responder)". Furthermore, in a field of "reception beam ID" of "STA (Responder)", a reception beam ID #rrxN corresponding to each beam pattern is described.

As described above, each beam pattern assigned different beam IDs depending on whether the wireless communication apparatus operates as an AP or an STA and whether the beam pattern is used in transmission or reception. Thus, it is possible to distinguish, by the beam IDs, between AP and STA and between transmission and reception.

Protocol Control in Beamforming Training

An example of an operation of the wireless communication apparatus 102 (103) in the beamforming training in the communication system 100 shown in FIG. 2 is described below.

Figure 6:
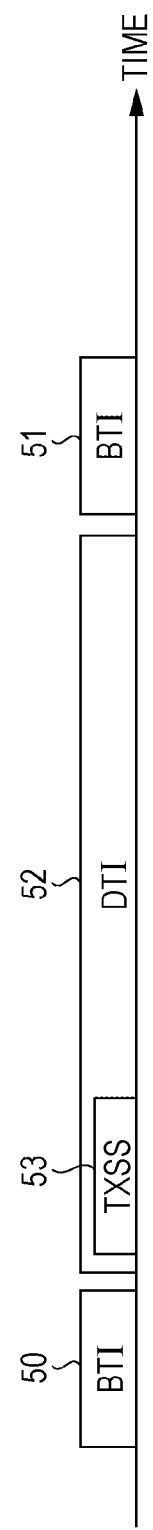
FIG. 6 is a sequence diagram illustrating an example of a protocol control in beamforming training in a communication system 100.

FIG. 6 is a sequence diagram illustrating an example of a protocol control in the beamforming training in the communication system 100. The sequence (scheduling) shown in FIG. 6 is controlled by an AP that manages communication (connections) in the communication system 100. In the following description, it is assumed by way of example that the AP is an initiator that transmits a start notification of a beamforming training process, and the STA is a responder that receives the start notification of the beamforming training process.

In FIG. 6, the AP periodically provides a BTI (Beacon Transmission Interval) 50 which is an interval in which a beacon is transmitted. More specifically, when a particular time has elapsed since the end of the BTI 50, the AP starts a next BTI 51. Although two BTIs, that is, the BTI 50 and the BTI 51 are shown in FIG. 6, the BTI is provided repeatedly at particular time intervals until the AP stops the operation.

A DTI (Data Transmission Interval) 52, which is an interval in which a data frame is transmitted, is provided between the BTI 50 and the BTI 51. In the DTI 52, data is transmitted and received between the AP and the STA. BTI and DTI are defined in IEEE802.11ad.

The AP provides a TXSS (transmission beamforming training interval) 53 in the DTI 52. The TXSS 53 is an interval in which transmission beam training is performed by sweeping beams (that is, by performing transmit sector sweep) for testing communication quality of transmission sectors. The operation of the communication system 100 in the TXSS 53 is described in further detail below. Operation in TXSS (transmission beamforming training interval)

Figure 7:
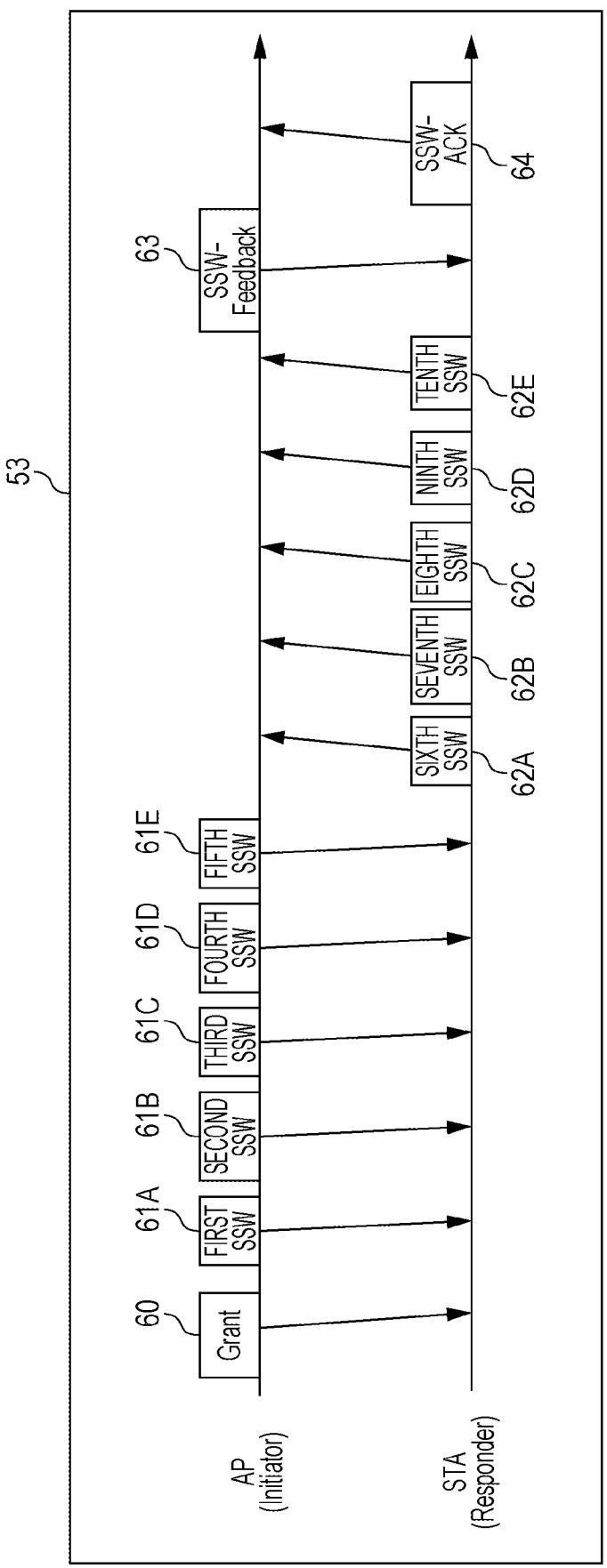
FIG. 7 is a sequence diagram illustrating an example of an operation of AP and STA in TXSS.

FIG. 7 is a sequence diagram illustrating an example of an operation of the AP and the STA in the TXSS 53. In the TXSS 53, first, the AP transmits a Grant frame 60, which is a protocol control frame, to the STA.

Figure 8:
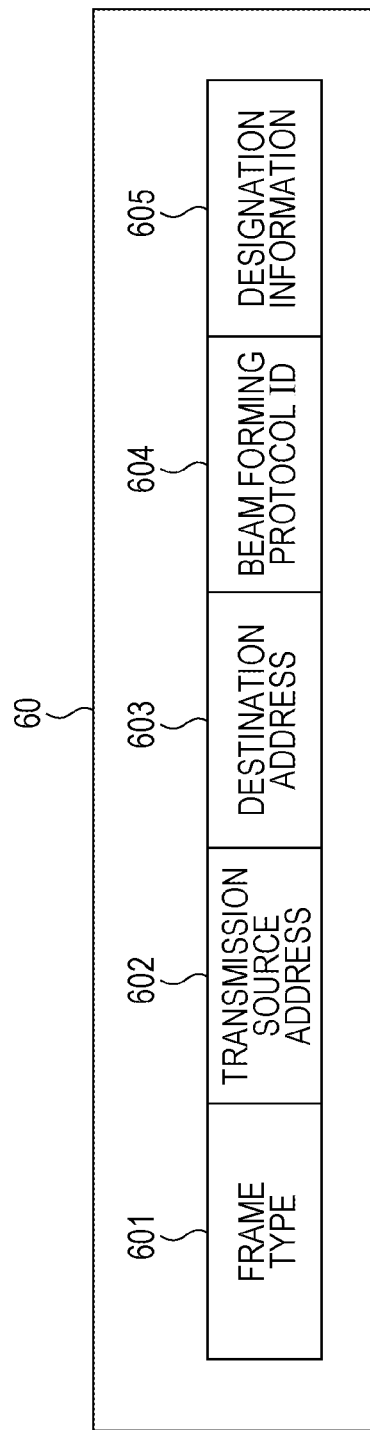
FIG. 8 is a diagram illustrating an example of a frame format of a Grant frame which is a protocol control frame.

FIG. 8 is a diagram illustrating an example of a frame format of the Grant frame 60 which is a protocol control frame. As shown in FIG. 8, the Grant frame 60 includes a frame type 601, a transmission source address 602, a destination address 603, a beam forming protocol ID 604 and specification information 605 indicating a reception quality measurement method.

The frame type 601 is an identifier or the like indicating that a frame is a protocol control frame. The transmission source address 602 is an address (for example, a MAC address or a device ID) of the AP that transmits the Grant frame 60. The destination address 603 is an identifier (for example, a MAC address or a device ID) of the STA that receives the Grant frame 60.

The beam forming protocol ID 604 is an identifier for notifying the STA that the transmission beamforming training according to the present disclosure is to be started. The specification information 605 is a field including information specifying that the STA that receives Grant frame 60 to employ a method of measuring reception quality of first to fifth SSW frames 61A to 61E (first training frames) transmitted following the Grant frame 60. As described above, the measurement method of the reception quality may be, for example, any one of or any combination of RSSI, SNR, SINR, BER, PER, FER, and the number of retransmissions.

The explanation is further continued referring again to FIG. 7. In FIG. 7, after the AP transmits the Grant frame 60, the AP transmits the first to fifth SSW frames 61A to 61E.

FIG. 9 is a diagram illustrating an example of a beam pattern used by each of AP and STA when the first to tenth SSW frames shown in FIG. 7 are transmitted and received. In FIG. 9, SSW frames are sequentially transmitted using transmission beams such that a first SSW frame 61A including a transmission beam ID #itx1 is transmitted using a transmission beam ID #itx1 corresponding to a beam pattern #1, a second SSW frame 61B including a transmission beam ID #itx2 is transmitted using a transmission beam ID #itx2 corresponding to a beam pattern #2, a third SSW frame 61C including a transmission beam ID #itx3 is transmitted using a transmission beam ID #itx3 corresponding to a beam pattern #3, a fourth SSW frame 61D including a transmission beam ID #itx4 is transmitted using a transmission beam ID #itx4 corresponding to a beam pattern #4, and a fifth SSW frame 61E including a transmission beam ID #itx5 is transmitted using a transmission beam ID #itx5 corresponding to a beam pattern #5.

The first to fifth SSW frames 61A to 61E correspond to the first training frames. FIG. 10 is a diagram illustrating an example of a frame format of the SSW frame 61 used as the first training frame. Hereinafter, one of, or generically all of, the first to fifth SSW frames 61A to 61E is also referred to as an SSW frame 61. As shown in FIG. 10, the SSW frame 61 includes a frame type 611, a transmission source address 612, a destination address 613, and a transmission beam ID 614.

The frame type 611 is an identifier indicating that the frame is the first training frame (one of the first to fifth SSW frames 61A to 61E). The transmission source address 612 is an address (for example, a MAC address or a device ID) of an AP that transmits an SSW frame 61. The destination address 613 is an identifier (for example, a MAC address or a device ID) of an STA that receives an SSW frame 61. The transmission beam ID 614 is a beam ID corresponding to a transmission beam pattern used by an AP that transmits an SSW frame 61. That is, the SSW frame 61 includes a transmission beam ID of a beam pattern used in transmission by an AP (wireless communication apparatus) that transmits the SSW frame 61.

The explanation is further continued referring again to FIG. 7. The STA receives the Grant frame 60 using a reception beam ID #rrx0 corresponding to an omnidirectional beam pattern. The STA then receives the first to fifth SSW frames 61A to 61E without changing the beam pattern. When the STA receives the first to fifth SSW frames 61A to 61E, the STA measures reception quality of each SSW frame using the reception quality measurement method specified by the specification information 605 in the Grant frame 60, and generates a reception quality measurement result Result_STA.

Specific examples of the reception quality measurement result Result_STA are described below. FIG. 11 is a diagram illustrating examples of reception quality measured by the STA for the first to fifth SSW frames 61A to 61E. In the examples shown in FIG. 11, it is assumed by way of example that SNR is used as the reception quality measurement method. In FIG. 11, the SNR is represented in index values converted from dB values.

In FIG. 11, the beam ID acquired from the transmission beam ID 614 included in the received first SSW frame 61A is #itx1 and the reception quality measurement result is "80" for the received first SSW frame 61A, the beam ID acquired from the transmission beam ID 614 included in the received second SSW frame 61B is #itx2 and the reception quality measurement result is "90" for the received second SSW frame 61B, the beam ID acquired from the transmission beam ID 614 included in the received fourth SSW frame 61D is #itx4 and the reception quality measurement result is "100" for the received fourth SSW frame 61D, and the beam ID acquired from the transmission beam ID 614 included in the received fifth SSW frame 61E is #itx5 and the reception quality measurement result is "70" for the received fifth SSW frame 61E.

FIG. 11 does not include the beam ID and the reception quality for the third SSW frame 61C. This means that the STA did not receive the third SSW frame 61C. Note that when the AP transmits the first to fifth SSW frames 61A to 61E, the AP changes the beam pattern each time one SSW frame 61 is transmitted. Therefore, there can occur a possibility that the STA does not receive an SSW frame 61, as with the case shown in FIG. 11 in which the third SSW frame 610 is not received.

The explanation is further continued referring again to FIG. 7. After the AP transmits the fifth SSW frame 61E, the AP sets the beam pattern to the reception beam ID #irx0 corresponding to the omnidirectional beam pattern #0 to measure the reception quality of the training frame transmitted by the STA.

After the STA receives the fifth SSW frame 61E, the STA sequentially transmits a sixth SSW frame 62A including a transmission beam ID #rtx1 using a transmission beam ID #rtx1 corresponding to the beam pattern #1, a seventh SSW frame 62B including a transmission beam ID #rtx2 using a transmission beam ID #rtx2 corresponding to the beam pattern #2, an eighth SSW frame 62C including a transmission beam ID #rtx3 using a transmission beam ID #rtx3 corresponding to the beam pattern #3, a ninth SSW frame 62D including a transmission beam ID #rtx4 using a transmission beam ID #rtxr corresponding to the beam pattern #4, and a tenth SSW frame 62E including a transmission beam ID #rtx5 using a transmission beam ID #rtx5 corresponding to the beam pattern #5, as shown in FIG. 9.

The sixth to tenth SSW frames 62A to 62E correspond to the second training frames. The frame format of the SSW frame 62 used as the second training frame is similar to the frame format of the SSW frame 61 used as the first training frame shown in FIG. 10, and thus a further description thereof is omitted. Hereinafter, one of, or generically all of, the sixth to tenth SSW frames 62A to 62E is also referred to as an SSW frame 62.

Each SSW frame may include a beam ID selected by a wireless terminal that received the SSW frame and reception quality thereof. More specifically, the STA may transmit information indicating the beam ID that provides the highest reception quality among the received first to fifth SSW frames 61A to 61E and the measured reception quality thereof such that the beam ID and the reception quality are included in the sixth to tenth SSW frames 62A to 62E.

After the AP transmits the fifth SSW frame 61E, the AP receives the sixth to tenth SSW frames 62A to 62E transmitted from the STA, and measures the reception quality of each SSW frame using the same reception quality measurement method as the reception quality measurement method notified, using the specification information 605 in the Grant frame 60, to the STA, and generates a reception quality measurement result Result_AP.

Specific examples of the reception quality measurement result Result_AP are described below. FIG. 12 is a diagram illustrating, by way of example, beam IDs and measurement results of reception quality acquired from transmission beam IDs 614 included in the SSW frames when the AP receives the sixth to tenth SSW frames 62A to 62E. In the examples shown in FIG. 12, as in FIG. 11, it is assumed by way of example that SNR is used as the reception quality measurement method.

FIG. 12 shows the beam ID acquired from the transmission beam ID 614 included in the received sixth SSW frame 62A is #rtx1 and the reception quality measurement result is "30" for the received sixth SSW frame 62A, the beam ID acquired from the transmission beam ID 614 included in the received seventh SSW frame 62B is #rtx2 and the reception quality measurement result is "90" for the received seventh SSW frame 62B, the beam ID acquired from the transmission beam ID 614 included in the received eighth SSW frame 62C is #rtx3 and the reception quality measurement result is "80" for the received eighth SSW frame 62C, the beam ID acquired from the transmission beam ID 614 included in the received ninth SSW frame 62D is #rtx4 and the reception quality measurement result is "95" for the received ninth SSW frame 62D, and the beam ID acquired from the transmission beam ID 614 included in the received tenth SSW frame 62E is #rtx5 and the reception quality measurement result is "60" for the received tenth SSW frame 62E.

The explanation is further continued referring again to FIG. 7. After the AP receives the tenth SSW frame 62E, the AP generates an SSW-Feedback frame 63 as a first feedback frame including the measurement result Result_AP of the reception quality of the received sixth to tenth SSW frames 62A to 62E, and the AP transmits the generated SSW-Feedback frame 63 using the omnidirectional beam pattern, that is, the beam pattern corresponding to the transmission beam ID #itx0.

Figure 13:
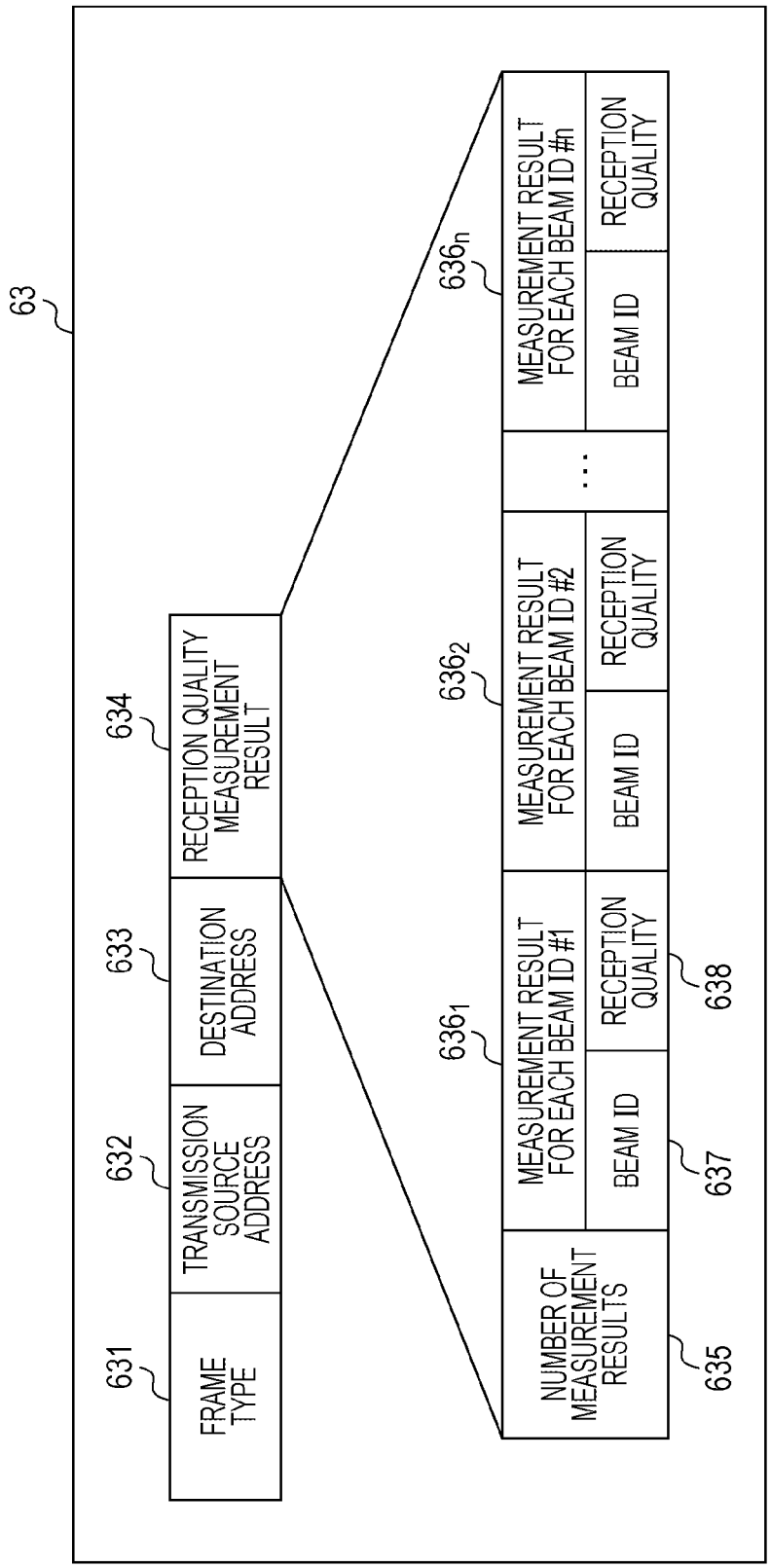
FIG. 13 is a diagram illustrating an example of a frame format of an SSW-Feedback frame which is a first feedback frame.

FIG. 13 is a diagram illustrating an example of a frame format of the SSW-Feedback frame 63 which is the first feedback frame. In FIG. 13, the SSW-Feedback frame 63 includes a frame type 631, a transmission source address 632, a destination address 633, and a measurement result 634.

The frame type 631 is an identifier or the like indicating that a frame is the SSW-Feedback frame 63. The transmission source address 632 is an address (for example, a MAC address or a device ID) of the AP that transmits the SSW-Feedback frame 63. The destination address 633 is an identifier (for example, a MAC address or a device ID) of the STA that receives the SSW-Feedback frame 63. The measurement result 634 corresponds to the reception quality measurement result Result_AP described above.

The measurement result 634 further includes, as shown in FIG. 13, the number of measurement results 635, and a measurement result #n $636_n$ for each beam ID (n is a positive integer corresponding to the total number of SSW frames, of the received SSW frames, for which beam IDs have been acquired and reception quality has been measured). Note that in a case where n=0, the measurement result #n $636_n$ includes no data. The number of measurement results 635 is a field including information regarding the number of measurement results included in the measurement result 634. More specifically, "5" is stored in the number of measurement results 635 in the SSW-Feedback frame 63 which is the first feedback frame, and "4" is stored in the number of measurement results 635 in the SSW-ACK frame 64 which is the second feedback frame. The measurement result #n $636_n$ includes a beam ID 637 and reception quality 638, that is, the measurement result #n $636_n$ is a field including information indicating a beam ID and measured reception quality acquired from an SSW frame when the AP receives the sixth to tenth SSW frames 62A to 62E.

The explanation is further continued referring again to FIG. 7. After the STA receives the SSW-Feedback frame 63 transmitted by the AP, the STA acquires the measurement result 634 corresponding to Result_AP from the SSW-Feedback frame 63. The STA selects, based on the acquired Result_AP, a transmission beam pattern satisfying a particular selection criterion, and the STA associates the selected beam pattern with a transmission beam ID #rtx_select used in communication with the AP.

A specific example of the particular selection criterion is described below. For example, in a case where there is another communication system at a location close (as close as interference can occur) to the communication system 100, the STA selects, as a transmission beam pattern for use by the STA, a beam pattern having lowest reception quality of beam patterns satisfying the reception quality that allows it to achieve communication quality (throughput, delay time, and the like) required by an application. For example, in a case where Result_AP has a value shown by way of example in FIG. 12 and the reception quality that allows it to achieve the communication quality required by the application is, for example, SNR=70, the STA may select a beam #itx3 with quality of "80" which is the lowest among beams with SNR higher than "70". For example, in a case where the reception quality that allows it to achieve the communication quality required by the application is SNR=50, the STA may select a beam #itx5 with quality of "60" which is the lowest among beams with SNR higher than "50".

On the other hand, in a case where there is no other communication system at a location close (as close as interference can occur) to the communication system 100, the STA may select, as the transmission beam pattern for use by the STA, a beam ID that provides the highest reception quality. More specifically, the STA selects, as #rtx_select, #rtx4 having reception quality of "95".

The explanation is further continued referring again to FIG. 7. After the STA selects the transmission beam pattern from the acquired Result_AP, the STA generates an SSW-ACK frame 64, as a second feedback frame, including measurement result Result_STA indicating a result of measurement of reception quality of the first to fifth SSW frames 61A to 61E, and the STA transmits, to the AP, the generated SSW-ACK frame 64 using a beam pattern corresponding to a transmission beam ID # rtx0 which is an omnidirectional beam pattern. Note that instead of using the omnidirectional beam pattern in the transmission, the STA may transmit the generated SSW-ACK frame 64 using a beam pattern corresponding to the selected beam ID #rtx select.

The frame format of the SSW-ACK frame, which is the second feedback frame, is similar to the frame format of the second SSW-Feedback frame described above with reference to FIG. 13, and thus a further description thereof is omitted.

The AP receives the SSW-ACK frame 64 transmitted by the STA and acquires the reception quality measurement result Result_STA included in the SSW-ACK frame 64. The STA selects, based on the acquired Result_STA, a transmission beam pattern satisfying a particular selection criterion, and the AP associates the selected beam pattern with a transmission beam ID #itx_select used in communication with the STA. The particular selection criterion is similar to that for the selection by the STA based on the Result_AP described above, and thus a further description thereof is omitted.

The protocol control of the beamforming training in the wireless communication apparatus 102 (103) has been described above. As described above, in the communication system 100 according to the embodiment of the disclosure, in TXSS 53 which is an interval in which the transmission beam pattern is determined, when the STA receives the first to fifth SSW frames 61A to 61E transmitted from the AP, the STA measures the reception quality of the SSW frame 61 and transmits, to the AP, the SSW-ACK frame 64 (second feedback frame) including the measurement result Result_STA. In response, the AP selects a beam pattern satisfying the particular selection criterion based on Result_STA and employs the selected beam pattern as the transmission beam pattern for use in transmission to the STA.

In a case where in TXSS 53 the AP receives the sixth to tenth SSW frames 62A to 62E (second training frames) transmitted from the STA, the AP measures the reception quality of the SSW frames 62 and transmits the measurement result by incorporating it in an SSW-Feedback frame 63 (first feedback frame) to the STA. In response, the STA selects a beam pattern satisfying the particular selection criterion based on Result STA and employs the selected beam pattern as a transmission beam pattern for use in transmission to the AP.

The technique described above makes it possible for the AP to acquire the information regarding the reception quality of the beam received by the STA without resulting in an increase in data size of the training frames.

Next, an example of an individual operation of each of the AP and STA is described below.

Example of Operation of AP

Figure 14:
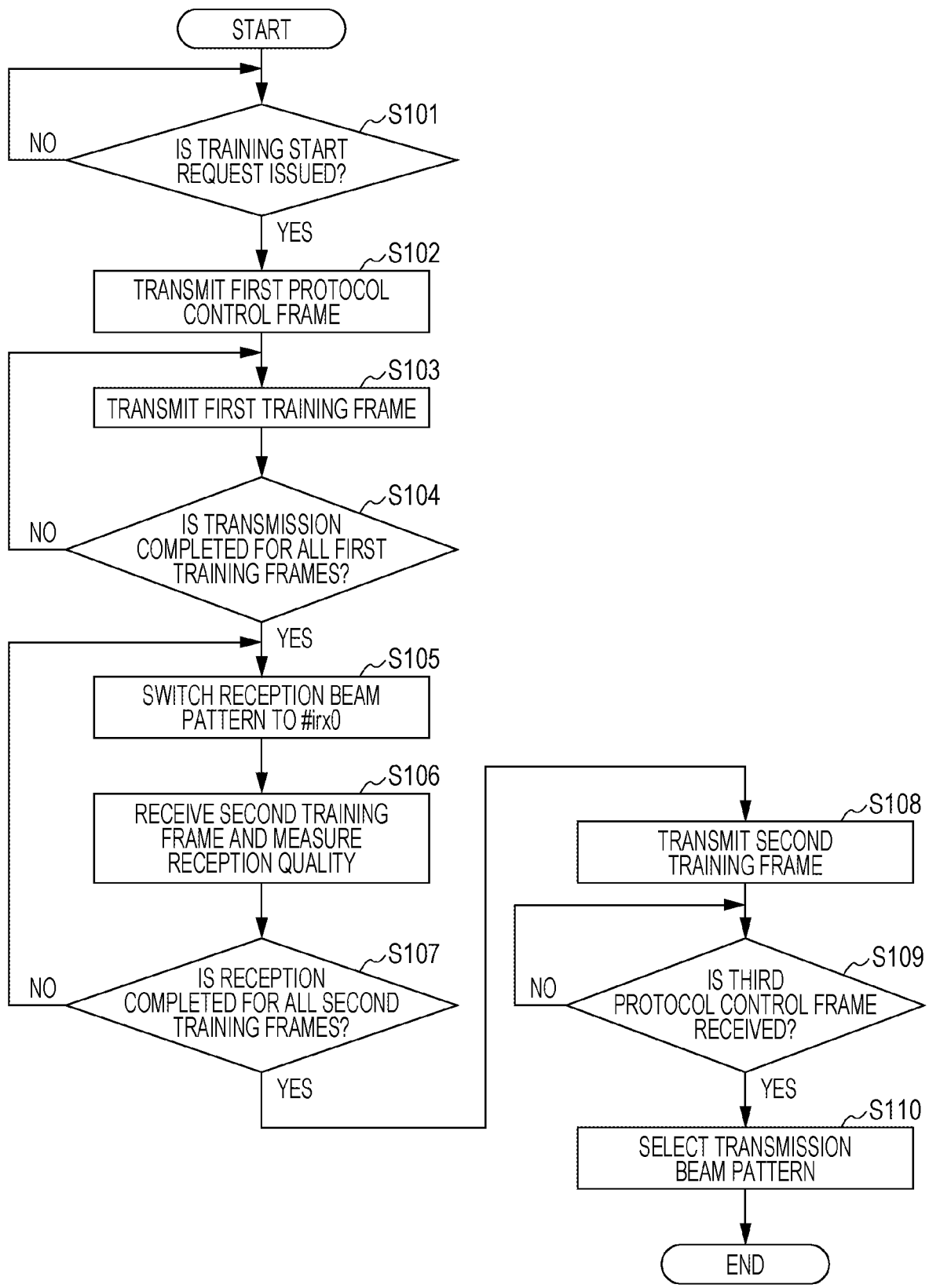
FIG. 14 is a flow chart illustrating an example of an operation of AP in a case where AP is an initiator.

An example of an operation of the AP in beamforming training in the communication system 100 according to an embodiment of the disclosure is described below. FIG. 14 is a flow chart illustrating an example of an operation of the AP when the AP operates as an initiator.

In step S101, the protocol controller 12 of the AP determines whether a beamforming training start request is input from the MAC controller 11. In a case where the training start request is input from the MAC controller 11 (YES in S101), the process proceeds to step S102. In a case where the training start request is not input from the MAC controller 11 (NO in S101), step S101 is repeated.

In step S102, the protocol controller 12 outputs, to the control frame generator 13, a protocol control frame generation request for starting the protocol control of the beamforming training, and the transmitter 15 transmits a protocol control frame generated by the control frame generator 13 to the STA. As described above, the protocol control frame corresponds to the Grant frame 60 shown in FIG. 7, and the protocol control frame includes an identifier (beam forming protocol ID) indicating that the beamforming training according to the present embodiment of the disclosure is to be started and specification information 605 specifying the method of measuring the reception quality of the SSW frame received by the STA.

In step S103, the protocol controller 12 outputs a first training frame generation request to the frame generator 14. In response, the frame generator 14 generates a plurality of first training frames, and the transmitter 15 transmits the generated plurality of first training frames to the STA while switching the directional beam pattern each time one frame is transmitted. As described above, the first training frames correspond to the first to fifth SSW frames 61A to 61E shown in FIG. 7.

In step S104, the protocol controller 12 determines whether the transmission is completed for all first training frames. In a case where it is determined that the transmission is completed for all first training frames, (YES in S104), the process proceeds to step S105, but otherwise (NO in S104) the process returns to step S103.

In step S105, the protocol controller 12 outputs a reception beam switch instruction to the receiver 18 to switch the beam pattern to an omnidirectional beam pattern (beam ID #irx0) for use in receiving the second training frame transmitted, in response to receiving the first training frame, by the STA. As described above, the second training frames correspond to the sixth to tenth SSW frames 62A to 62E shown in FIG. 7.

In step S106, the protocol controller 12 instructs that the plurality of second training frames transmitted from the STA are received by the reception antenna unit 17 using the omnidirectional beam pattern, and instructs that the quality measurer 20 measures the reception quality of each of the received second training frames.

If at least one second training frame can be received, the protocol controller 12 of the AP can know the timing of the end of the transmission of the second training frames.

For example, in a case where each second training frame includes information indicating the number of frames that have already been transmitted and information indicating the total number of frames to be transmitted, or in a case where each second training frame includes information indicating the number of remaining frames to be transmitted, the protocol controller 12 of the AP can calculate the end of the second training frames from the number of remaining frames to be transmitted because each second training frame has a fixed length and the modulation rate is fixed.

In step S107, the protocol controller 12 of the AP determines whether the transmission of the second training frames from the STA is completed and at least one of the plurality of the second training frames is received. In a case where it is determined that the transmission of the second training frames from the STA is completed, and at least one second training frame is received (YES in S107), the process proceeds to step S108, but otherwise (in a case where any one of the second training frames is not received) (NO in S107), the process returns to step S105.

In step S108, the protocol controller 12 outputs, to the control frame generator 13, a request for generation of a first feedback frame including the reception quality measurement result generated in step S106, and performs control such that the generated first feedback frame is transmitted to the STA.

As described above, the first feedback frame corresponds to the SSW-Feedback frame 63 shown in FIG. 7.

In step S109, the protocol controller 12 determines whether a second feedback frame is received from the STA. As described above, the second feedback frame corresponds to the SSW-ACK frame 64 shown in FIG. 7, and includes the result of the measurement of the reception quality of the first training frames received by the STA. In a case where it is determined that the second feedback frame is received (YES in S109), the process proceeds to step S110, but otherwise (NO in S109), the process repeats step S109.

In step S110, the protocol controller 12 selects a transmission beam pattern satisfying the particular selection criterion based on the measurement result, included in the second feedback frame received in step S109, as to reception quality of the first training frames received by the STA. The transmission beam pattern selected in this step S110 will be used later by the AP in transmission to the STA.

The protocol controller 12 then stores a beam ID corresponding to the selected transmission beam pattern and the STA which is the destination of the transmission in the management table 21 in an associated manner. Thereafter, the beamforming training process is ended.

Example of Operation of STA

Figure 15:
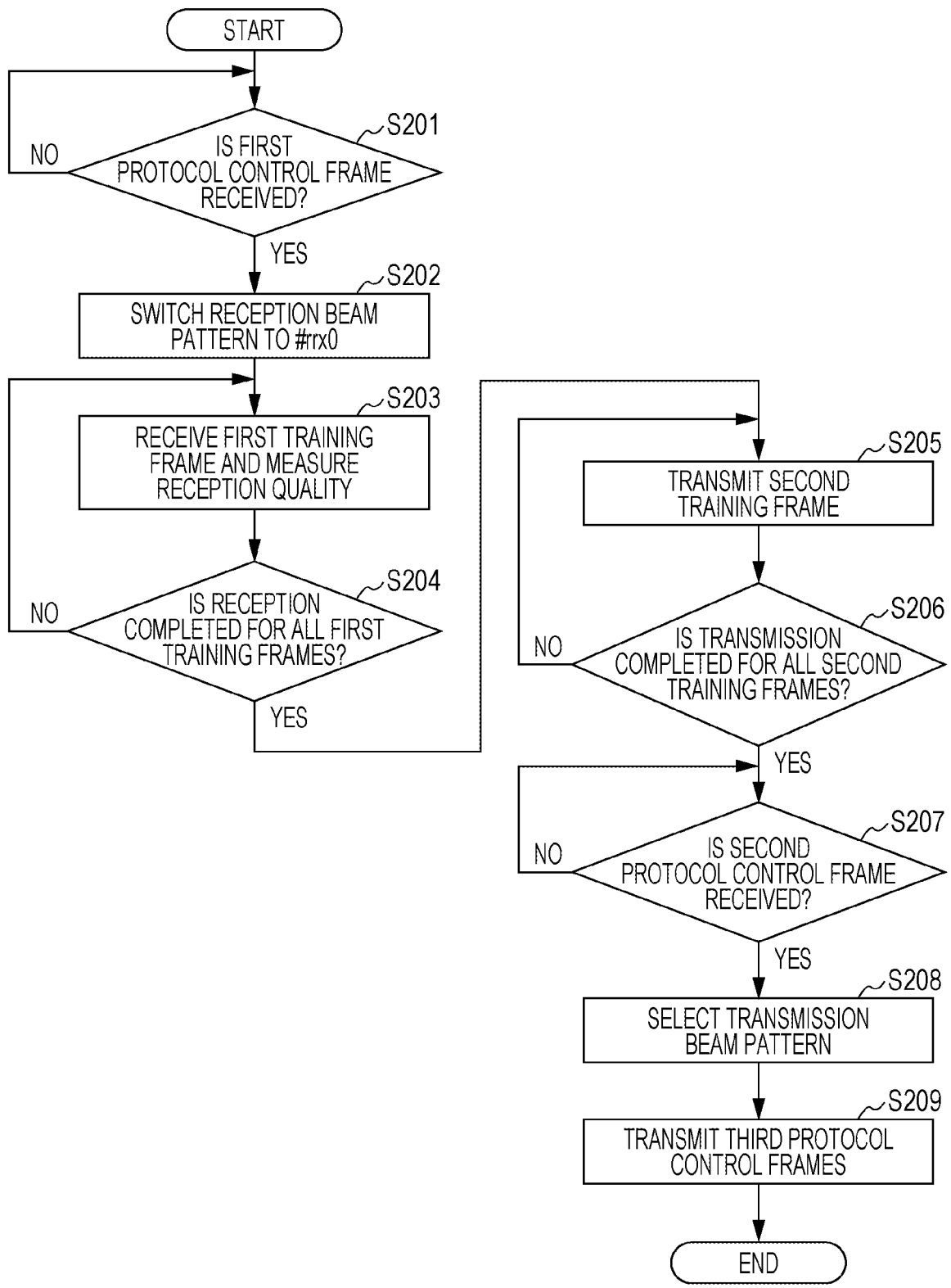
FIG. 15 is a flow chart illustrating an example of an operation of AP in a case where AP is an initiator.

Next, an example of an operation of the STA in the beamforming training in the communication system 100 according to an embodiment of the disclosure is described below. FIG. 15 is a flow chart illustrating an example of an operation of the STA when the STA operates as a responder.

In step S201, the filter 19 determines whether a protocol control frame transmitted from the AP is received. In a case where a protocol control frame transmitted from the AP is received (YES in S201), the filter 19 outputs the protocol control frame to the MAC controller 11, but otherwise (NO in S201), the filter 19 repeats step S201. As described above, the protocol control frame corresponds to the Grant frame 60 shown in FIG. 7, and includes an identifier (beam forming protocol ID) indicating that the beamforming training according to the present embodiment of the disclosure is to be started.

In step S202, the protocol controller 12 outputs a reception beam switch instruction to the receiver 18 to switch the beam pattern to an omnidirectional beam pattern for use in receiving a plurality of first training frames transmitted from the AP following the protocol control frame.

In step S203, the protocol controller 12 instructs that the reception antenna unit 17 receives the plurality of first training frames transmitted from the AP by using the omnidirectional beam pattern and that the quality measurer 20 measures the reception quality of each of the received first training frames.

If at least one second training frame can be received, the protocol controller 12 of the STA can know the timing of the end of the transmission of the first training frames.

For example, in a case where each first training frame includes information indicating the number of frames that have already been transmitted and information indicating the total number of frames to be transmitted, or in a case where each first training frame includes information indicating the number of remaining frames to be transmitted, the protocol controller 12 of the STA can calculate the end of the first training frames from the number of remaining frames to be transmitted because each first training frame has a fixed length and the modulation rate is fixed.

In step S204, the protocol controller 12 of the STA determines whether the transmission of the first training frames from the AP is completed and at least one of the plurality of the first training frames is received. In a case where it is determined that the transmission of the first training frames from the AP is completed, and at least one first training frame is received (YES in S204), the process proceeds to step S206, but otherwise (in a case where any one of the first training frames is not received) (NO in S204), the process returns to step S203.

In step S205, the protocol controller 12 outputs a second training frame generation request to the frame generator 14. In response, the frame generator 14 generates a plurality of second training frames, and the transmitter 15 transmits the generated plurality of second training frames to the AP while switching the beam pattern used in the transmission each time one frame is transmitted. As described above, the second training frames correspond to the sixth to tenth SSW frames 62A to 62E shown in FIG. 7.

In step S206, the protocol controller 12 determines whether the transmission is completed for all second training frames. In a case where it is determined that the transmission is completed for all second training frames, (YES in S206), the process proceeds to step S207, but otherwise (NO in S206), the process returns to step S205.

In step S207, the protocol controller 12 determines whether a first feedback frame is received from the AP. As described above, the first feedback frame corresponds to the SSW-Feedback frame 63 shown in FIG. 7. In a case where it is determined that the first feedback frame is received (YES in S207), the process proceeds to step S208, but otherwise (NO in S207), the process repeats step S207.

In step S208, the protocol controller 12 of the STA selects a transmission beam pattern satisfying a particular selection criterion based on the measurement result 634 included in the first feedback frame received in step S207. The transmission beam pattern selected in this step S208 will be used later by the STA in transmission to the AP. The protocol controller 12 then stores a beam ID corresponding to the selected transmission beam pattern and the AP which is the destination of the transmission in the management table 21 in an associated manner.

In step S209, the protocol controller 12 instructs that a second feedback frame generation request is to be output to the control frame generator 13, and the generated second feedback frame is to be transmitted to the transmitter 15 and is to be further transmitted to the AP from the transmission antenna unit 16. As described above, the second feedback frame corresponds to the SSW-ACK frame 64, and includes a measurement result 634 of the reception quality of the first training frames received by the STA. After the transmission of the second feedback frame is completed, the protocol controller 12 ends the beamforming training.

In the communication system 100 according to the embodiment of the disclosure, as described above, in TXSS 53 which is an interval in which the transmission beam pattern is determined, when the STA receives first training frames (the first to fifth SSW frames 61A to 61E) transmitted from the AP, the STA measures the reception quality of the SSW frame 61 and transmits the measurement result Result_STA to the AP by transmitting the second feedback frame (the SSW-ACK frame 64) including the measurement result Result_STA. In response, the AP selects a beam pattern satisfying the particular selection criterion based on Result_STA and employs the selected beam pattern as the transmission beam pattern for use in transmission to the STA.

In a case where in TXSS 53 the AP receives the second training frames (the sixth to tenth SSW frames 62A to 62E) transmitted from the STA, the AP measures the reception quality of the SSW frames 62 and transmits the measurement result to the STA by incorporating the measurement result in the first feedback frame (the SSW-Feedback frame 63). In response, the STA selects a beam pattern satisfying the particular selection criterion based on Result_STA and employs the selected beam pattern as a transmission beam pattern for use in transmission to the AP.

In the communication system 100 according to the embodiment of the disclosure, the technique described above makes it possible for the AP to acquire the information regarding the reception quality of the beam received by the STA without resulting in an increase in data size of the training frames.

In the above description, it is assumed by way of example that the beamforming training is performed using the first training frame and the second training frame. However, if the AP can get to know the reception quality at the STA, the AP can select a transmission beam pattern. Therefore, the beamforming training may be performed using the Grant frame 60 and the second training frames (the sixth to tenth SSW frames 62A to 62E) transmitted from the STA, and the first feedback frame (SSW-Feedback frame 63) shown in FIG. 7. Alternatively, the beamforming training may be performed using the Grant frame 60, the first training frames (the first to fifth SSW frames 61A to 61E) transmitted from the AP, and the second feedback frame (the SSW-ACK frame 64).

The embodiments have been described above with reference to the drawings. However, the present disclosure is not limited to those embodiments. It will be apparent to those skilled in the art that many various modifications or changes may be applicable to the embodiments without departing from the scope of the present disclosure. Note that any resultant modification or change also falls within the scope of the present disclosure. Furthermore, constituent elements of different embodiments may be combined without departing from the spirit and the score of the present disclosure.

Figure 16:
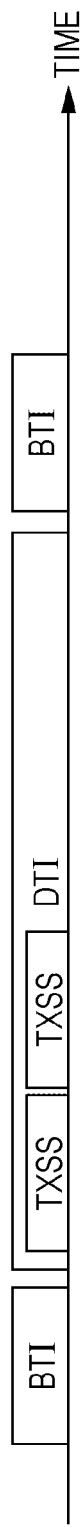
FIG. 16 is a sequence diagram illustrating an example of a protocol control in beamforming training with two STAs.

In the embodiments described above, it is assumed by way of example that the communication system 100 includes one AP and one STA. However, the present disclosure is not limited to those embodiments. For example, the communication system according to the present disclosure may include a plurality of APs and a plurality of STAs. For example, in a case where one AP communicates with a plurality of STAs, a plurality of TXSSs for the STAs may be sequentially provided depending on the number of STAs. FIG. 16 is a sequence diagram illustrating an example of a protocol control in the beamforming training for two STAs.

Each functional block according to the embodiments described above may be typically realized by an integrated circuit such as an LSI having input and output terminals. Each of the functional blocks may be formed individually on one chip, or part or all of the functional blocks may be formed on one chip. The LSI may also be referred to as an IC (Integrated Circuit), a system LSO, a super LSI, or an ultra LSI depending on the degree of integration.

Furthermore, the technique of implementing the integrated circuit is not limited to the LSI, but the integrated circuit may be realized in the form of a dedicated circuit or a general-purpose processor. The integrated circuit may also be realized using an FPGA (Field Programmable Gate Array) that can be programmed after the manufacture of the LSI or a reconfigurable processor that is allowed to be reconfigured in terms of the connection or the setting of circuit cells in the inside of the LSI.

When a new integration circuit technique other than LSI techniques are realized in the future as a result of an advance in semiconductor technology or related technology, the functional blocks may be realized using such a new technique. A possible example of a new technique is biotechnology.

SUMMARY OF THE PRESENT DISCLOSURE

The present disclosure provides a communication system including one or more wireless terminal apparatuses and a base station apparatus that performs a wireless communication with the one or more wireless terminal apparatuses, wherein in a transmission beamforming training interval in which beamforming training of a transmission beam is performed, the base station apparatus transmits to the wireless terminal apparatus a plurality of first training frames while sequentially switching a plurality of first transmission beam patterns, the one or more wireless terminal apparatuses perform an operation including receiving the plurality of first training frames using a particular beam pattern, measuring first reception quality of the received plurality of first training frames, and generating a second feedback frame including the measured first reception quality and transmitting the generated second feedback frame to the base station apparatus, and the base station apparatus performs an operation including receiving the second feedback frame, and selecting one beam pattern from the plurality of first transmission beam patterns based on the first reception quality included in the second feedback frame.

In the communication system according to the present disclosure, the one or more wireless terminal apparatuses perform an operation including after receiving the plurality of first training frames using a particular beam pattern, transmitting, to the base station apparatus, a plurality of second training frames while sequentially switching a plurality of second transmission beam patterns, the base station apparatus performs an operation including receiving the plurality of second training frames using a particular beam pattern, measuring second reception quality of the received plurality of second training frames, and transmitting, to the one or more wireless terminal apparatuses, a first feedback frame including the measured second reception quality, and the base station apparatus performs an operation including receiving the first feedback frame, and selecting a transmission beam pattern based on the second reception quality included in the received first feedback frame.

In the communication system according to the present disclosure, the base station apparatus and the wireless terminal apparatus perform a wireless communication according to IEEE802.11ad.

In the communication system according to the present disclosure, when the transmission beamforming training interval is started, the base station apparatus transmits, to the wireless terminal apparatus, a frame including an identifier notifying the wireless terminal apparatus of the start of specific beamforming training.

In the communication system according to the present disclosure, the reception quality is any one of or any combination of at least Received Signal Strength (RSSI), Signal-to-Noise Ratio (SNR), Signal-to-Interference plus Noise power Ratio (SINR), Bit Error Rate (BER), Packet Error Rate (PER), Frame Error Rate (FER), and the number of retransmissions.

In the communication system according to the present disclosure, after the transmission beamforming training with a first wireless terminal apparatus of the one or more wireless terminal apparatuses is completed, the base station apparatus subsequently performs the transmission beamforming training with a second wireless terminal apparatus of the one or more wireless terminal apparatuses.

The present disclosure provides a method of controlling a communication system including one or more wireless terminal apparatuses and a base station apparatus that performs a wireless communication with the one or more wireless terminal apparatuses, the method including, in a transmission beamforming training interval in which beamforming training of a transmission beam is performed, the base station apparatus transmitting to the wireless terminal apparatus a plurality of first training frames while sequentially switching a plurality of first transmission beam patterns; the one or more wireless terminal apparatuses performing an operation including receiving the plurality of first training frames using a particular beam pattern, measuring first reception quality of the received plurality of first training frames, and generating a second feedback frame including the measured first reception quality and transmitting the generated second feedback frame to the base station apparatus, and the base station apparatus performing an operation including receiving the second feedback frame, and selecting one beam pattern from the plurality of first transmission beam patterns based on the first reception quality included in the second feedback frame.

The present disclosure provides a base station apparatus that performs a wireless communication with one or more wireless terminal apparatus, including a transmission circuit, a reception circuit, a control circuit, and a control circuit, wherein in a transmission beamforming training interval in which beamforming training of a transmission beam is performed, the transmission circuit transmits, to the one or more wireless terminal apparatuses, a plurality of first training frames while sequentially switching a plurality of first transmission beam patterns, the reception circuit receives a second feedback frame including first reception quality of the plurality of first training frames transmitted from the one or more wireless terminal apparatuses, and the control circuit selects one beam pattern from the plurality of first transmission beam patterns based on the first reception quality included in the second feedback frame.

The present disclosure provides a wireless terminal apparatus that performs a wireless communication with a base station apparatus, including a reception circuit, a measurement circuit, a control frame generation circuit, and a transmission circuit, wherein in a transmission beamforming training interval in which beamforming training of a transmission beam is performed, the reception circuit receives, using a particular beam pattern, the plurality of first training frames transmitted by the base station apparatus while sequentially switching the plurality of first transmission beam patterns, the measurement circuit measures first reception quality of the received plurality of first training frames, the control frame generation circuit generates a second feedback frame including the measured first reception quality, and the transmission circuit transmits to the base station apparatus the generated second feedback frame.

The present disclosure can be preferably applied to a communication system in which beam forming training is performed.

What is claimed is:

1. A communication system, comprising:
   one or more wireless terminal apparatuses; and
   a base station apparatus that performs a wireless communication with the one or more wireless terminal apparatuses, wherein in a transmission beamforming training interval in which beamforming training of a transmission beam is performed, the base station apparatus transmits to the one or more wireless terminal apparatuses a protocol control frame including a designation field indicating a reception quality measuring method and transmits a plurality of first training frames while sequentially switching a plurality of first transmission beam patterns, the one or more wireless terminal apparatuses perform an operation including, receiving the protocol control frame, receiving the plurality of first training frames using a particular beam pattern, measuring first reception quality of the received plurality of first training frames according to the reception quality measuring method indicated in the received protocol control frame, and generating a second feedback frame including the measured first reception quality and transmitting the generated second feedback frame to the base station apparatus, and the base station apparatus performs an operation including, receiving the second feedback frame, and selecting one beam pattern from the plurality of first transmission beam patterns based on the first reception quality included in the second feedback frame.

2. The communication system according to claim 1, wherein, the one or more wireless terminal apparatuses perform an operation including, after receiving the plurality of first training frames using a particular beam pattern, transmitting, to the base station apparatus, a plurality of second training frames while sequentially switching a plurality of second transmission beam patterns, the base station apparatus performs an operation including, receiving the plurality of second training frames using a particular beam pattern, measuring second reception quality of the received plurality of second training frames, and transmitting, to the one or more wireless terminal apparatuses, a first feedback frame including the measured second reception quality, and the one or more wireless terminal apparatuses perform an operation including, receiving the first feedback frame, and selecting a transmission beam pattern based on the second reception quality included in the received first feedback frame.

3. The communication system according to claim 1, wherein the base station apparatus and the one or more wireless terminal apparatuses perform a wireless communication according to IEEE802.11ad.

4. The communication system according to claim 1, wherein when the transmission beamforming training interval is started, the base station apparatus transmits, to the one or more wireless terminal apparatuses, a frame including an identifier notifying the one or more wireless terminal apparatuses of the start of specific beamforming training.

5. The communication system according to claim 1, wherein the reception quality measuring method includes measuring any one of or any combination of at least Received Signal Strength (RSSI), Signal-to-Noise Ratio (SNR), Signal-to-Interference plus Noise power Ratio (SINR), Bit Error Rate (BER), Packet Error Rate (PER), Frame Error Rate (FER), and the number of retransmissions.

6. The communication system according to claim 1, wherein after the transmission beamforming training with a first wireless terminal apparatus of the one or more wireless terminal apparatuses is completed, the base station apparatus subsequently performs the transmission beamforming training with a second wireless terminal apparatus of the one or more wireless terminal apparatuses.

7. A method of controlling a communication system including one or more wireless terminal apparatuses and a base station apparatus that performs a wireless communication with the one or more wireless terminal apparatuses, the method comprising:

in a transmission beamforming training interval in which beamforming training of a transmission beam is performed, the base station apparatus transmitting to the one or more wireless terminal apparatuses a protocol control frame including a designation field indicating a reception quality measuring method and transmitting a plurality of first training frames while sequentially switching a plurality of first transmission beam patterns, the one or more wireless terminal apparatuses performing an operation including, receiving the protocol control frame, receiving the plurality of first training frames using a particular beam pattern, measuring first reception quality of the received plurality of first training frames according to the reception quality measuring method indicated in the received protocol control frame, and generating a second feedback frame including the measured first reception quality and transmitting the generated second feedback frame to the base station apparatus, the base station apparatus performing an operation including, receiving the second feedback frame, and selecting one beam pattern from the plurality of first transmission beam patterns based on the first reception quality included in the second feedback frame.

8. A base station apparatus that performs a wireless communication with one or more wireless terminal apparatuses, comprising:

a transmission circuit;

a reception circuit; and a control circuit, wherein in a transmission beamforming training interval in which beamforming training of a transmission beam is performed, the transmission circuit transmits, to the one or more wireless terminal apparatuses, a protocol control frame including a designation field indicating a reception quality measuring method and transmits a plurality of first training frames while sequentially switching a plurality of first transmission beam patterns, the reception circuit receives a second feedback frame including first reception quality of the plurality of first training frames, which is measured according to the reception quality measuring method indicated in the protocol control frame and is transmitted by one of the one or more wireless terminal apparatuses, and the control circuit selects one beam pattern from the plurality of first transmission beam patterns based on the first reception quality included in the second feedback frame.

9. A wireless terminal apparatus that performs a wireless communication with a base station apparatus, comprising
    a reception circuit;
    a measurement circuit;
    a control frame generation circuit;
    a transmission circuit, wherein
    in a transmission beamforming training interval in which beamforming training of a transmission beam is performed,
    the reception circuit receives a protocol control frame including a designation field indicating a reception quality measuring method and receives, using a particular beam pattern, the plurality of first training frames transmitted by the base station apparatus while sequentially switching the plurality of first transmission beam patterns,
    the measurement circuit measures first reception quality of the received plurality of first training frames according to the reception quality measuring method indicated in the received protocol control frame,
    the control frame generation circuit generates a second feedback frame including the measured first reception quality, and
    the transmission circuit transmits to the base station apparatus the generated second feedback frame.

* * * * *